W. OHLIGER.
METHOD OF FORMING WAFER CAPSULES.
APPLICATION FILED JULY 2, 1912.
1,084,708.
Patented Jan. 20, 1914.
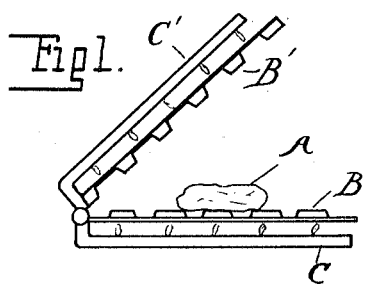
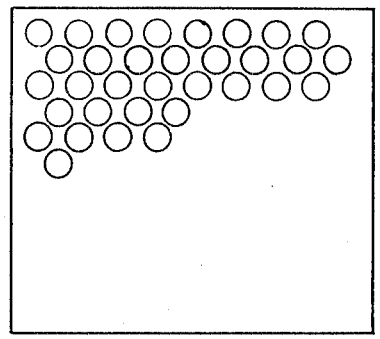
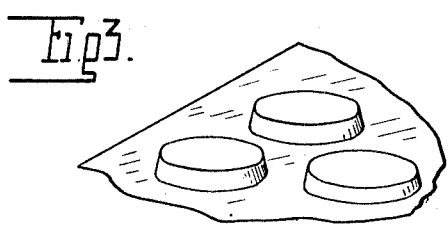
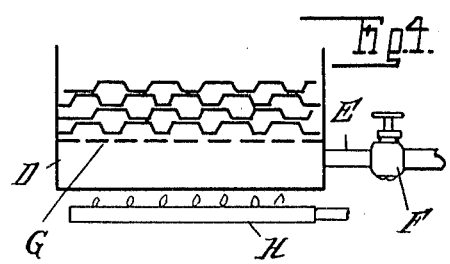
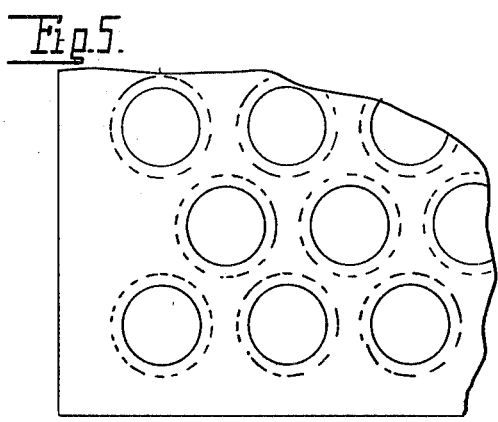
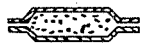
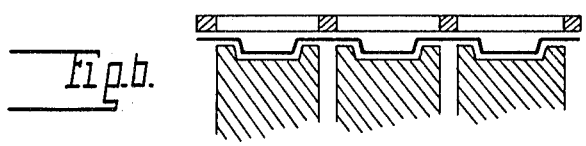
Witnesses
W. K. Ford
James P. Barry
Inventor
Willard Ohliger
By Whittemore Hulbert & Whittemore
Att'ys

UNITED STATES PATENT OFFICE.

WILLARD OHLIGER, OF DETROIT, MICHIGAN, ASSIGNOR TO FREDERICK STEARNS & COMPANY, OF DETROIT, MICHIGAN, A CORPORATION OF MICHIGAN.

METHOD OF FORMING WAFER-CAPSULES.

1,084,708.  Specification of Letters Patent.  Patented Jan. 20, 1914.

Application filed July 2, 1912. Serial No. 707,181.

*To all whom it may concern:*

Be it known that I, WILLARD OHLIGER, a citizen of the United States of America, residing at Detroit, in the county of Wayne and State of Michigan, have invented certain new and useful Improvements in Methods of Forming Wafer-Capsules, of which the following is a specification, reference being had therein to the accompanying drawings.

In the present state of the art, one type of capsule which has been used consists of. pairs of flanged, cupped disks, having the flanges thereof affixed to each other. Such capsules are usually formed of a starchy body-material which is placed between suitably fashioned mold-plates and is heated to cook the starch in a similar manner to the well-known process of cooking waffles. The mold-plates contain a multiplicity of individual capsule molds, and the starchy body is distributed thereover so as to form a connecting web between the adjacent capsules from which the flanges may be cut by dies or other tools. In the practical manufacture of such capsules the multiple sheets are readily formed by the process just described, but great difficulty has been experienced in cutting the sheets to form the individual flanged capsules. The reason for this is that the dried sheets are extremely brittle and are usually cracked by the cutting instrument, while the large number of capsules in each sheet require considerable time for cutting where they are individually operated upon. On the other hand any attempt to cut the capsules by a multiple die, which will simultaneously operate upon all of the individual capsules in the sheet, introduces a further difficulty in that the expansion or contraction of the material under different conditions will throw the capsules out of registration with the cutting die. As a result, the only successful process heretofore employed, so far as I am aware, is that in which the capsules are successively cut from the sheet by a single die, which, as above stated, is a slow and tedious operation.

I have overcome the difficulty in the use of the multiple cutting die by a process in which the moisture content of the sheets is altered to produce an expansion or contraction whereby exact registration with the die is obtained.

In the drawings: Figure 1 shows diagrammatically the mold-plates in which the sheets of capsules are formed. Fig. 2 is a plan view of one of the sheets. Fig. 3 is a perspective view of a fragment of a sheet. Fig. 4 illustrates an apparatus in which the moisture content of the sheets is altered. Fig. 5 is a plan of a portion of a sheet indicating in dotted lines the arrangement of the multiple cutting die. Fig. 6 is a cross section through the multiple die; and Fig. 7 is a section through the completed capsule.

In carrying out the process the sheets are first formed by placing a suitable quantity of the plastic starch body, as indicated at A, between a pair of coöperating mold-plates B and B', preferably hinged to each other. These mold-plates are provided with suitable heating means such as the gas burners C and C', so that when closed together the starchy material will at first be distributed over the plate and then cooked. The sheet may be readily removed upon the opening of the mold-plates and will have the appearance illustrated in Figs. 2 and 3.

The starchy material is extremely sensitive to moisture and consequently when the sheets are transferred to the cutting dies they are seldom in a condition where they will perfectly register with said dies; usually the sheets are too dry, but occasionally in damp weather they may be too moist. In either case the registration of the individual capsules with the multiple cutting dies is destroyed. I have overcome the difficulty by subjecting the sheets, before the cutting operation, to a treatment which will alter the moisture content. This, where the sheets are too dry, may be accomplished by placing them in a suitable receptacle or holder D, into the lower portion of which steam is introduced through a conduit E, controlled by a valve F. The sheets may be supported upon a perforated grid or shelf G, and the moisture rising from the bottom will permeate the material forming the sheets, expanding them to the proper size. By adjusting the valve F the operator may alter the amount of moisture and thus is enabled to produce just the proper degree of expansion.

In case the weather is damp it may be necessary to dry the sheets, which may be accomplished by dry heat, as for instance, by arranging a burner H beneath the holder D and by turning off the valve F.

When the sheets have been treated as just described, they are placed successively in multiple cutting dies, such as shown in Figs. 5 and 6, the flanged individual capsules being cut from the web portion of the sheet. Pairs of capsules may then be filled with the medicinal compound and secured to each other by moistening the flanges and pressing together.

What I claim as my invention is:

1. The method of forming capsules, which consists in molding multiple forms in a sheet, in treating said sheet to alter the moisture content thereof in order to secure registration of the mold sheet with the cutting die, and in placing the altered sheet in registration with a multiple cutting die and in severing the capsule from the sheet by said die.

2. The process of forming capsules which consists in molding multiple forms in a sheet, in subjecting said sheet to a moist atmosphere to expand the same in order to secure registration of the mold sheet with the cutting die, and in severing the capsules from the sheet with a multiple die registering with said sheet in its expanded condition.

In testimony whereof I affix my signature in presence of two witnesses.

WILLARD OHLIGER.

Witnesses:
C. A. SMITH,
W. O. COCHRANE.

---

Copies of this patent may be obtained for five cents each, by addressing the "Commissioner of Patents, Washington, D. C."